June 16, 1936.  S. ISENBERG  2,044,354
STICK HOLDER
Filed April 1, 1933  3 Sheets-Sheet 1

Inventor
Stanley Isenberg
By Maurice S. Cayne
Atty.

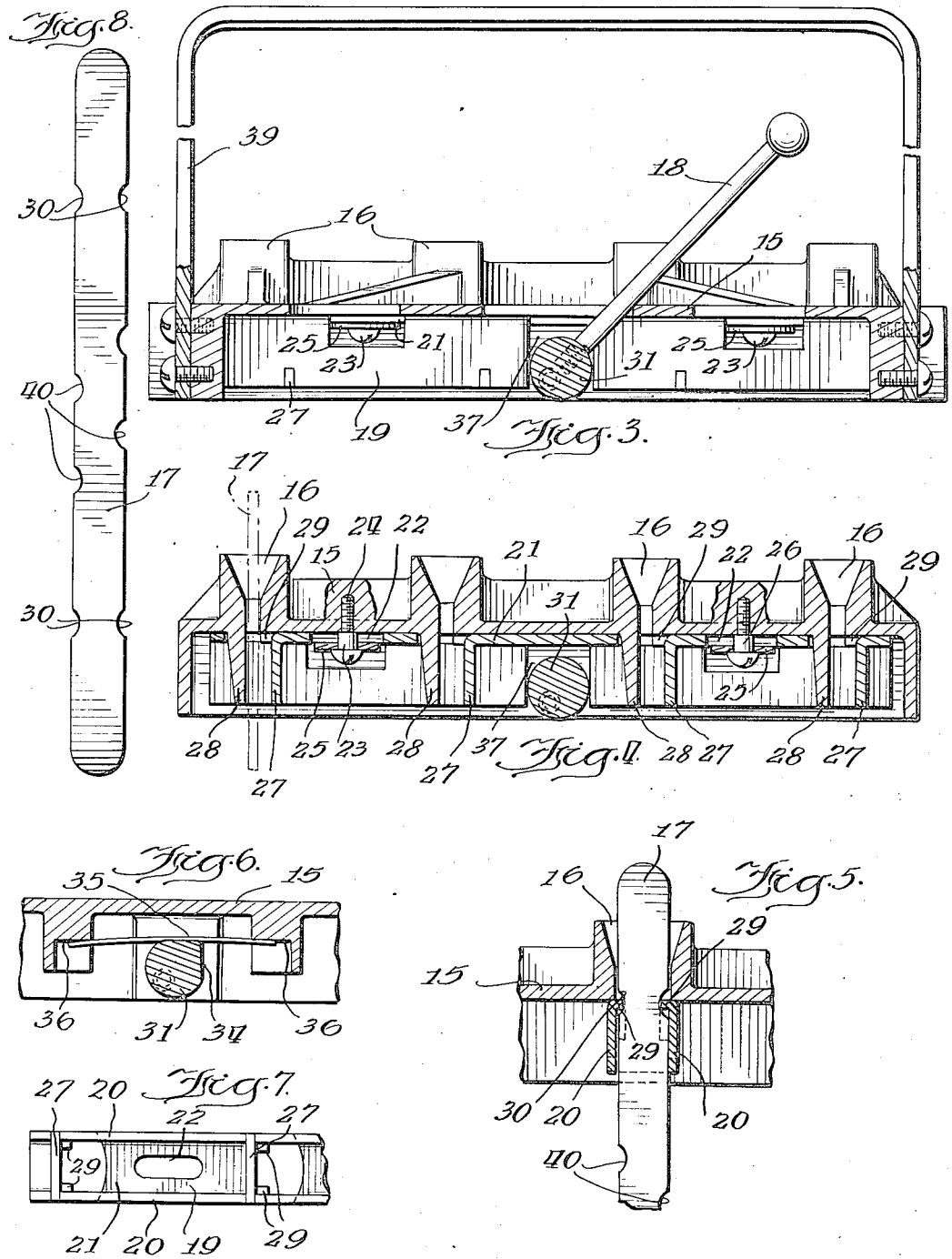

June 16, 1936.  S. ISENBERG  2,044,354
STICK HOLDER
Filed April 1, 1933  3 Sheets-Sheet 3
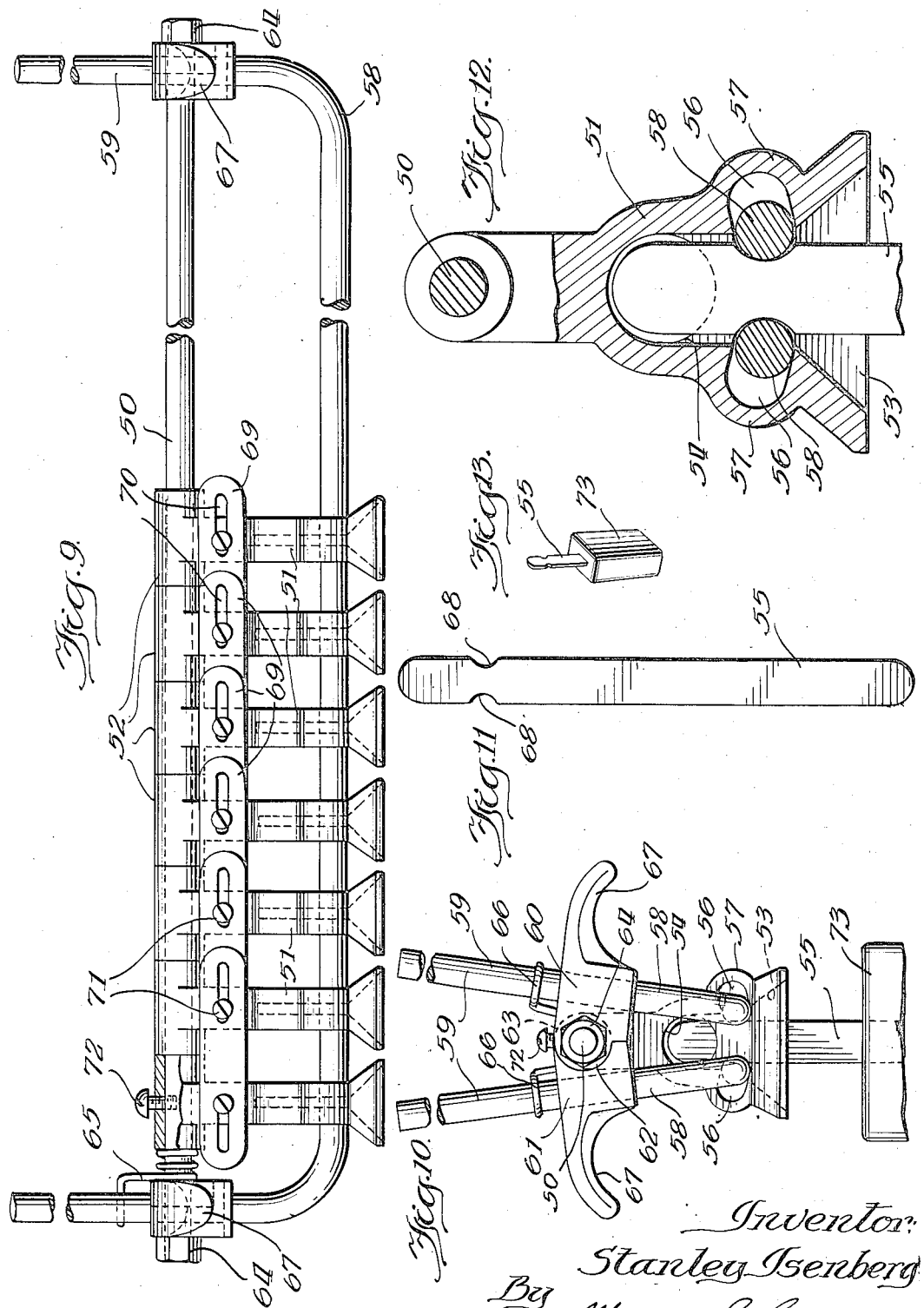

Patented June 16, 1936

2,044,354

UNITED STATES PATENT OFFICE 2,044,354

STICK HOLDER

Stanley Isenberg, Chicago, Ill.

Application April 1, 1933, Serial No. 663,961

4 Claims. (Cl. 107—8)

My invention relates to improvements in means for producing molded or frozen confection or the like, and more particularly to the provision of novel and improved mechanism to be used in the production of a confection mounted upon a stem which also serves as a handle for said confection.

It is the main object of this invention to provide in a device of the character described novel and improved stick holding means whereby only specially prepared sticks may be employed with my improved stick holding means.

Another object of this invention is to provide in an apparatus of the character described novel and improved stick holding means whereby the sticks can be quickly associated with said holding means and quickly removed therefrom after the confections have been frozen, said stick holding means being capable of engaging said sticks at certain predetermined points only without damaging or causing injury to said sticks.

A further object of this invention is the provision of a device of this character embodying a removable plate having means associated therewith for supporting and carrying a plurality of sticks, with novel means for centering the plate whereby the sticks will be simultaneously centered relative to the molds, said stick supporting means carried by said plate being arranged so as to engage said sticks at predetermined points only, and when engaged at other points along said sticks will cause damage or injury to said sticks.

A still further object of this invention is the provision of a novel and improved stick holding mechanism having means associated therewith for detachably securing said sticks in place and means provided on both said sticks and stick holding means whereby the locking of said sticks must be made at certain predetermined points along said sticks without causing damage or injury to said sticks.

A still further object of this invention is the provision of a device of this character embodying a removable plate having means associated therewith for supporting and carrying a plurality of sticks, said last mentioned means being arranged for co-operation with notched portions provided on said sticks whereby the locking of said sticks within said plate can be made only at said notched portions without causing injury to said sticks.

A still further object of this invention is the provision of a device of this character embodying a removable plate having means associated therewith for supporting and carrying a plurality of sticks, means provided on said sticks for co-operation with the locking means provided on said plate whereby said sticks must be supported in said plate at certain predetermined points along said sticks in order to prevent damage or injury to said sticks.

A still further object of this invention is the provision of novel means for detachably associating the sticks with the stick plate, whereby the sticks can be quickly associated with the plate and quickly removed therefrom after the confections have been frozen.

A still further object of this invention is the provision of a device of this character which will be simple in construction, assembly and operation, which may be produced along lines convenient for low cost manufacture, which will be durable in use and which will be highly efficient for carrying out the purpose for which it is designed.

With the foregoing and other objects in view, which will appear as the description proceeds, the invention consists in certain novel features of construction, arrangement and combination of parts, hereinafter more fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings preferred embodiments thereof, from an inspection of which, when considered in connection with the foregoing description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 3 is a transverse sectional view taken on line 3—3 of Fig. 1;

Fig. 4 is a transverse sectional view taken on line 4—4 of Fig. 1;

Fig. 5 is a sectional view through one of the stick receiving openings and taken substantially on line 5—5 of Fig. 1;

Fig. 6 is a sectional view through the stick locking means taken on line 6—6 of Fig. 1;

Fig. 7 is a fragmentary bottom plan view of the stick locking bar;

Fig. 8 is an elevational view of one of my improved sticks to be used with the stick carrier plate;

Fig. 9 is a side elevational view of a modified form of stick carrier mechanism;

Fig. 10 is an end elevational view of the mechanism shown in Fig. 9;

Fig. 11 is an elevational view shown in Fig. 9;

Fig. 12 is a transverse sectional view through the stick holding means shown in Fig. 9; and Fig. 13 is a view in perspective of a frozen confection with my improved stick embedded therein.

Figure 1:
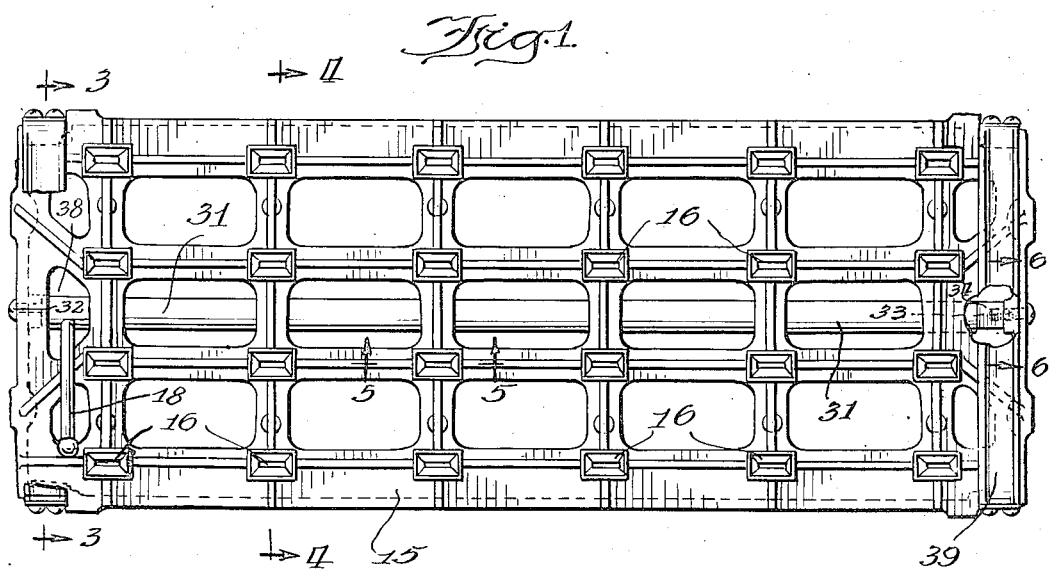
Figure 1 is a top plan view of the stick carrier plate embodying the principle of my invention.
Figure 2:
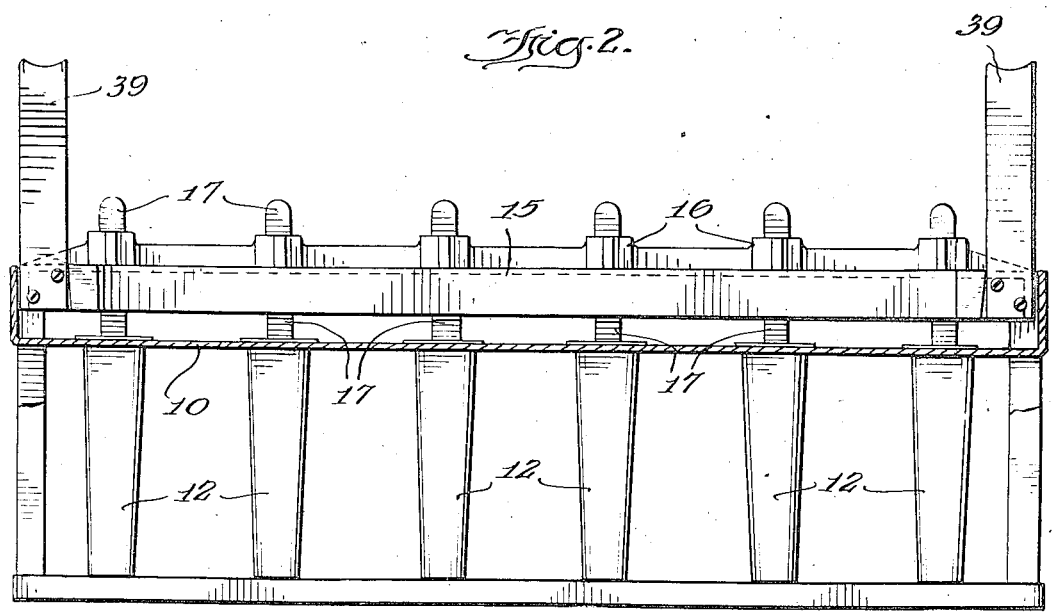
Fig. 2 is a side elevational view of the same showing the same in position over a plurality of molds.

Referring to the drawings more specifically by characters of reference, the numeral 10 designates generally a built up frame or support having the plate 11 from which are supported a plurality of molds 12. Said frame or support 10 is of generally rectangular form and is provided with four parallel rows of confection molds 12, said molds 12 being of oval cross section tapering towards their bottom ends.

The frame 10 is provided with the upstanding flanges 13 extending above the mold supporting plate 11, and said flange 13 forms a box-like housing, or the like, for receiving the stick carrier plate to be presently more fully described. The frame and molds provided therein may be made of any suitable material and in any convenient form. However, in the embodiment illustrated, the same is made of a size designed to fit all brine tanks now in use by ice cream manufacturers in the manufacture of frozen confection of this character. As the frame and molds per se do not form a part of the present invention, it is not thought necessary to describe the same in more detail.

In Fig. 1 is illustrated my improved stick carrier plate 15, which plate is also of rectangular shape and is adapted for reception within the space formed by the upstanding flanges 13, whereby it will be disposed in position on the plate 11 directly over the openings in the confection molds 12. The stick carrier plate 15 is preferably constructed of die cast aluminum and rust proof steel, and, as shown in the drawings, is provided with a plurality of funnels or openings 16 through which the sticks 17 may be inserted. These funnels or openings 16 are arranged as shown in the drawings in four parallel rows, and when the said sticks are inserted in said openings a single operation of a cam lever 18 will lock the said sticks in place and the operation of said cam lever 18 in the reverse direction will release all of said sticks. The stick plate thus serves a double purpose of accurately centering the sticks in the confections and supplying a holder with which the entire twenty-four frozen confections may be withdrawn from their molds in one operation. The mechanism for locking the sticks within the stick plate 15 will now be more fully described.

Disposed on the under side of the stick plate 15 directly below each transverse row of openings 16 is a locking bar 19, said locking bar being provided with the depending side flanges 20 and intermediate portion 21, said intermediate portion being provided with elongated slots 22, through which slots is adapted to extend the screw 23, said screw having a threaded portion 24 received in threaded engagement in a portion of the plate 15.

A suitable washer 25 may be interposed between the member 19 and the head of the screw 23. The screw 23 is provided with a flanged portion 26 whereby the said washer 25 will be spaced a definite distance from the bottom of the plate 15 to permit the member 19 to slide between said washer and bottom surface of the plate. The member 19 is adapted for transverse movement relative to the plate, and when in one position will be ineffective for locking the sticks inserted through the opening 16, and when in another position will be effective for locking said sticks to the plate.

The member 19 is provided intermediate its ends with a plurality of depending tongues 27, each of said tongues being adapted for co-operation with a depending portion 28 formed integral with the plate 15 for locking therebetween the stick 17. The tongue 27 may be formed integral with the member 19 and may be cut and pressed therefrom to the position shown in Fig. 4 of the drawings.

In order to adapt the locking bar or plate 19 for securing only sticks of predetermined design within the stick plate 15, the locking bar is provided adjacent each of the depending tongues 27 with inwardly extending projections or tongues 29, said projections or tongues being adapted for reception within the notches 30 provided on the stick 17. Thus when the stick 17 is disposed in operative position within the stick plate 15, the notches 30 will be disposed in position to receive the projections 29 of the locking bar when the latter has been moved to its locking position.

Should a stick not provided with the notches 30 be disposed in said stick plate the actuation of the locking bar to move it to its locked position will cause the projections 29 to engage the body of the stick and to injure or damage the same by reason of said engagement. It will thus be noted that only sticks of predetermined design may be employed with the stick plate above described.

In order to actuate the locking bars 19 so as to move the same into and out of locked position, there is provided a longitudinally disposed rod 31 extending along the full length of the underside of the stick plate 15 and having its ends eccentrically journaled in the side edges of the stick plate by means of the screws 32 and 33. The rod 31 is so mounted as to be capable of rotary movement about the pivot screws 32 and 33.

Adjacent one end of the rod is provided a suitable cam surface 34 on the outer periphery thereof, said cam surface being disposed for cooperation with a flat spring member 35, the ends of which spring are disposed on suitable bearings 36 provided therefor on the underside of the stick plate, said spring member 35 spanning the distance between the bearings 36 and has the central portion thereof in constant contacting engagement with the cam surface 34. By reason of the shape of the cam surface 34, it will be apparent from viewing the illustration in Fig. 6 of the drawings that said spring will be effective for holding said rod 31 in either of two positions, to which position said rod may be moved by the actuation of the actuating handle 18 connected to said rod adjacent one end thereof.

Each of the lock bars 19 has the depending flanges 20 thereof provided with a cut-out portion 37 intermediate their ends, said cut-out portion being adapted for receiving therein the body of the rod 31 in such a manner as to translate any rotary motion of the rod into reciprocating or sliding movement for the locking bars 19. As shown in the drawings, the rod operating handle 18 extends through a suitable opening 38 provided in the stick plate, said handle being so arranged as to be capable of operation by the same hand with which the operator grasps the stick plate handles 39 by means of which the stick plate may be lifted from the mold frame 10. The provision of the cam surface 34 with this cooperating spring member 35 will assure the holding of the locking bars in either a locked or unlocked position and the actuation of said rod handle 18 will immediately release or lock all of the sticks disposed within the stick plate simultaneously. In addition to the notches 30 which are provided adjacent each end of the stick 17, so that either end may be inserted into the confection mold 12, there are also provided a plurality of spaced notches 40 which will aid in anchoring the sticks within the frozen confection.

The operation of the mechanism so far described should be readily apparent to those skilled in the art to which this invention appertains. By means of a suitable gauge upon which the stick plate may be supported the required distance above a suitable surface, such as a table or the like, the sticks 17 may be dropped through the funnels 16, the said sticks coming to rest with their notches 30 disposed on the same level with the projections 29 of the locking bars 19.

When all of the sticks have been thus inserted, the actuation of the rod handle 18 in the desired direction will now move all of the locking bars to a position where they will lock the sticks in place in the plate. When in this position the projections 29 will have been received within their respective notches 30 thereby avoiding any injury to the sticks. However, should sticks of another design be inserted in the stick plate the movement of said locking bars to a locked position will cause said projection 29 to bite into the body portion of the stick injuring the same at those points. It will thus be noted that by reason of the construction hereinbefore described only sticks having the notches 30 provided therein at the desired points along said stick will be capable of use with the stick plate without causing injury or damage to the sticks.

After the insertion of all of the sticks within the stick plate, the plate is moved bodily and disposed within the frame 10 over the confection molds 12 which had previously been filled with the desired liquid and the sticks disposed within their respective molds. The entire mold may then be deposited within a suitable brine tank or the like and left there until the liquid in the molds has frozen solid. The entire mold is then defrosted by dipping the same in luke warm water or the like and the frozen confections removed from their molds by pulling up on the handles 39. The actuation of the rod lever 18 in the reverse direction will now release all of said sticks causing the confections to drop from the plate, which confections are now ready for disposition in suitable bags within which the same may be marketed.

In the modified form of stick holder shown in Figs. 9 to 12, there is provided a stick holding mechanism adapted for use only with sticks of predetermined design. The attempt to use sticks of other than this design will either render the mechanism ineffective for holding the sticks or will cause damage or injury to said sticks.

Referring more specifically to the drawings, the modified stick holder comprises a horizontally disposed longitudinally supporting rod 50 upon which are mounted for limited sliding movement a plurality of my improved stick holders generally designated by the reference character 51. The stick holders 51 may be formed from any suitable material, such as aluminum or the like, and are provided at its upper end with a collar 52, through which the rod 50 is loosely extended. Thus the special holders 51 are slidably mounted on said rod 50.

The body portion of the stick holder 51 is of generally bell shaped configuration and has a funnel opening 53 provided in its bottom end, said opening communicating with a central opening 54 provided in the body of the holder and in which is adapted to be received the upper end of the stick 55 when the latter is in locked position within the stick holder. The central opening 54 communicates with a pair of openings 56 provided adjacent each side thereof, said openings 56 extending completely through the projections 57 provided on the side edges of said holder.

The openings 56 are adapted to receive therethrough the rods 58, which rods are provided adjacent their ends with the upstanding arms 59 extending through vertical openings provided in hinge members 60 and 61. The hinge members 60 and 61 are provided with aligned ears 62 and 63, respectively, through which ears extend the free ends of the supporting rod 50.

As shown in Fig. 9 of the drawings, there is mounted a pair of such hinge members adjacent each end of the supporting rod, and said hinge members are securely locked in place on said rod by means of suitable nuts 64 threaded on the free ends of said rod 50. A suitable spiral spring member 65 has its central portion wound around one end of the rod 50 and the free end 66 of said spring member is disposed in position to engage the arms 59, as shown in Fig. 10, said spring being effective for normally urging the upper ends of said arms away from each other with the result that the lower portions of said arms or the rods 58 will be normally urged towards each other to what may be termed a locking position. To overcome the action of the spring 65, the upper ends of said arms 59 may be pressed by the operator towards each other, which action will result in bringing the rods 58 to their outermost position in their respective openings 56. Suitable finger grips 67 are formed integral with said spring members for facilitating in lifting the device bodily from the mold or the like over which the same may be disposed.

As shown in Fig. 11 of the drawings, the stick 55 which is to be used in conjunction with the making of a frozen confection on a stick when this improved type of stick holder is employed, comprises an elongated body portion, the side edges of which are notched as shown at 68 adjacent its upper end. By providing the notches 68 on the stick 55 it will be apparent that the insertion of the stick through the funnel opening 53 the stick may be disposed in position within its respective holder 53, in which position the notches 68 will be disposed directly in line with the opening 56, whereby the rods 58 will engage within said notches 68 for holding the stick in locked position.

Should an attempt be made to employ a stick not provided with the notches 68, the stick holders will either be ineffective for locking the sticks in place or they will injure said sticks by reason of the rods 58 biting into the side edges of the body of the stick. It will thus be apparent that only sticks of predetermined design may be satisfactorily employed with the stick holding mechanism just described.

A further feature of this modified form is that the same may be satisfactorily employed for freezing a plurality of sticks in a single block of frozen confection, which block may then be cut to divide the same into a plurality of smaller blocks each having a stem or stick frozen therein. By separating these frozen smaller blocks, the same may be dipped in a suitable covering material, such as chocolate or the like, for providing a covering for each of the individual blocks. To permit this operation, the holders 51 are mounted on the rod 50, so that they may be separated a required distance from each other when it is desired to provide the chocolate coating to said individual blocks.

As shown in Fig. 9 of the drawings, there are provided a plurality of link members 69, each one of which is provided with a pair of elongated slots 70 adjacent each end thereof. The links are secured to the side edges of the holders 51 in overlapping relation by means of screws 71 extending through said elongated slots and fastened to the body of the holders 51.

The extreme left hand holder mounted on the rod, as shown in Fig. 9, is rigidly secured to the rod by means of the set screw 72 which extends through the collar 52 of said holder and engages the body of the supporting rod 50. With the left hand holder 51 fixed to the rod 50, the remaining holders may be moved to the right, as viewed in Fig. 9, until all of said holders have been separated from each other the required distance permitted by the link members 69. When thus separated, the individual confection 73 carried by each holder 51 will be spaced from its next adjacent confection to permit the dipping of all of said confections simultaneously within a body of liquid chocolate or the like to give to said confections the desired coating.

The operation of the device just described should be apparent to those skilled in the art to which this invention appertains. When the holders 51 are in the position shown in Fig. 9, the sticks 55 may be inserted within the holders through the funnel openings 53, and when thus inserted the rods 58 will engage within the notches 68 provided in said sticks and will hold the latter in associated position with said holders.

The entire mechanism may then be supported in any suitable manner over a mold containing a liquid or semi-liquid body of edible material such as ice cream or the like with the sticks immersed within said body of material. When the material has been frozen the entire device may be removed with the frozen body attached thereto by means of the hand grips 67 provided on the hinge members. The mass of frozen confection may now be cut to produce individual blocks, each one of which will have one of the sticks 55 frozen therein. These individual blocks may now be separated from each other by pulling on the extreme right hand holder 51, shown in Fig. 9, and all of the blocks dipped in a solution of chocolate or the like for producing a coating for each individual block. After the confections have been coated and dried, the same may be released from the stick holding mechanism by pressing the upper ends of the arms 59 towards each other, whereby the rods 58 will be removed from their respective notches 68 in the sticks causing the said confections to drop from their respective stick holders. Said confections may now be suitably wrapped and are ready for sale.

From the above it should be apparent that I have provided a novel and improved stick holding mechanism for use in the making of confections frozen on a stick. Said mechanism is designed so as to be capable of use only with sticks of predetermined design and shape.

It will, of course, be obvious that the sticks need not be made of the particular shape and configurations shown, as the same may be made of any desired shape and notched in any desired manner, the only requirement being that the design of said sticks be such as to co-operate with the locking means provided on the stick carrier, whereby the said sticks may be readily associated with the carrier without causing injury or damage to the body of the stick.

It is believed that my invention, its mode of construction and assembly and operation, and many of its advantages should be readily understood from the foregoing without further description, and should also be manifest that while preferred embodiments of the invention have been shown and described for illustrative purposes, the structural details are nevertheless capable of wide variation within the purview of my invention as defined in the appended claims.

Having thus described my said invention, what I claim and desire to secure by Letters Patent of the United States is:

1. A stick handling device including a plate member, a guide tube mounted upon said plate member and adapted to receive a stick therethrough, said guide tube having one wall thereof extending below the plate member, a gripping member mounted to slide upon the plate member, said gripping member having a depending leg portion, means for advancing the gripping member towards the depending wall of the guide tube and into clamping engagement with a stick in said tube, and projections provided on said gripping member extending beyond the depending leg portion thereof and lying parallel to the plate member, whereby said projections will be received within the guide tube when the gripping member is in its locking position.

2. A stick handling device including a plate member, a row of stick receiving guide tubes fixed upon said plate member, each of said guide tubes having a depending side wall extending below the said plate member, a gripper bar disposed in parallelism with the row of guide tubes and mounted for sliding movement along the underside of said plate member, depending leg portions formed on said bar adapted for cooperation with the depending side walls of said guide tubes to grip therebetween sticks disposed within the guide tubes, and spaced projections provided on said gripper bar extending immediately beyond the depending leg portions thereof, said projections being adapted for disposition within the guide tubes when the gripper bar is in locking position.

3. A stick handling device including a plate member, guide tubes fixed on said plate member for receiving a plurality of sticks in aligned relation, each of said guide tubes having one side wall thereof extending below the said plate member, a gripping bar supported by said plate member and having depending leg portions disposed in parallelism with said depending side walls of said guide tubes, and means for moving said gripping bar to cause the depending leg portions thereof to engage the sticks disposed within the guide tubes and to thereby clamp said sticks between said depending side walls of the guide tubes and the depending leg portions of said gripping bar, and projections provided on said gripping bar extending just beyond the depending leg portions thereof for entry into the guide tube when the gripping bar has been moved to its locking position.

4. A stick handling device including a plate member, a unitary guide tube mounted upon said plate member and adapted to receive a stick therethrough, said guide tubes having one side wall thereof extending below the plate member, a gripping member mounted to slide upon the plate member, said gripping member having a depending leg portion, spaced projections extending from the bottom thereof just beyond said depending leg portion, means for advancing the gripping member into clamping engagement with a stick disposed in said tube, said spaced projections being received in the tube whereby only sticks having notches provided therein for accommodating the spaced projections may be supported by said stick handling device without injury to said sticks.

STANLEY ISENBERG.